United States Patent
Rosenthal

(10) Patent No.: US 7,320,724 B2
(45) Date of Patent: Jan. 22, 2008

(54) COMPOSITIONS FOR THE STAGED RELEASE OF NUTRIENTS TO PLANTS

(75) Inventor: Edward Rosenthal, Long Boat Key, FL (US)

(73) Assignee: Florikan E.S.A. Corporation, Sarasota, FL (US)

( * ) Notice: Subject to any disclaimer, the term of this patent is extended or adjusted under 35 U.S.C. 154(b) by 34 days.

(21) Appl. No.: 10/973,732

(22) Filed: Oct. 26, 2004

(65) Prior Publication Data

US 2006/0027007 A1    Feb. 9, 2006

Related U.S. Application Data

(60) Provisional application No. 60/599,534, filed on Aug. 6, 2004.

(51) Int. Cl.
*A01N 25/26* (2006.01)

(52) U.S. Cl. .......................... 71/64.11; 71/31
(58) Field of Classification Search ............... 71/64.11, 71/31
See application file for complete search history.

(56) References Cited

U.S. PATENT DOCUMENTS

| | | | |
|---|---|---|---|
| 3,158,462 A | 11/1964 | Hansen et al. | |
| 3,223,518 A | 12/1965 | Hansen et al. | |
| 3,259,482 A | 7/1966 | Hansen et al. | |
| 3,264,089 A | 8/1966 | Hansen et al. | |
| 4,321,078 A * | 3/1982 | Michaud | 71/44 |
| 4,769,027 A * | 9/1988 | Baker et al. | 424/493 |
| 4,857,098 A | 8/1989 | Shirley, Jr. | |
| 4,975,284 A * | 12/1990 | Stead et al. | 424/497 |
| 5,147,442 A | 9/1992 | Kosuge et al. | |
| 5,560,768 A | 10/1996 | Gordonov et al. | |
| 5,652,196 A * | 7/1997 | Luthra et al. | 504/359 |
| 6,080,221 A * | 6/2000 | Moore | 71/11 |
| 6,432,156 B1 * | 8/2002 | O'Donnell, Sr. | 71/28 |
| 6,500,223 B1 | 12/2002 | Sakai et al. | |
| 6,656,882 B2 * | 12/2003 | Tijsma et al. | 504/101 |

OTHER PUBLICATIONS

Tucker, Ray 'Essential Plant Nutrients', Oct. 1999, pp. 1-9, downloaded from www.ncagr.com/agronomi/essential.htm.*
Downloaded pages from www.florikan.com, on Feb. 16, 2007, including archived material from http://web.archive.org/web/20020922014500/http://florikan.com, dated Sep. 2002, 5 pages.*
Downloaded press release from http://www.anla.org dated Aug. 13, 2004.*
Santa Rosa County HortSense, 6 pages, vol. 2, Issue 1, Jan. 2003, see particularly p. 2.*

* cited by examiner

*Primary Examiner*—C. Sayala
(74) *Attorney, Agent, or Firm*—Hunton & Williams LLP; Eugene C. Rzucidlo

(57) ABSTRACT

A fertilizer composition is adapted to stage the controlled release of nutrients such that the composition need only be applied once in a plant's growth cycle, but with individual nutrients releasing at predetermined, staged intervals targeted to the precise needs of plants. Timed release particulate materials are blended to form the composition. The nutrients include a magnesium source (Mg), a potassium source (K), a nitrogen source (N), and a phosphate source (P). The composition is adapted to release each fertilizer nutrient over a period most beneficial to plants' physiological growth.

24 Claims, No Drawings

COMPOSITIONS FOR THE STAGED RELEASE OF NUTRIENTS TO PLANTS

CROSS-REFERENCE TO RELATED APPLICATIONS

This application claims priority from U.S. patent provisional application Ser. No. 60/599,534, entitled Compositions for the Staged Release of Nutrients to Plants, filed Aug. 6, 2004, and the complete content of that application are incorporated by reference.

BACKGROUND OF THE INVENTION

Achieving crop fertilization by timing the release or application of fertilizer nutrients is known. Fertilization in the container-grown wholesale plant industry, for example, has been accomplished by methods including:

Multiple applications of granular fertilizer
Overhead liquid application of soluble fertilizers
Incorporating slow release fertilizers into potting soil
Polymer coated fertilizers.

Each of these methods has associated drawbacks. In granular fertilizers, excessive moisture rapidly dissolves granular fertilizer, resulting in uncontrolled amounts of fertilizer being made available to the plant all at once. This forces growers to leach the soil to protect their plants from highly soluble salts, leaching fertilizer from the plant. The result is increased labor and fertilization costs, as well as an adverse impact on the environment.

Overhead liquid application of water-soluble fertilizers presents similar problems. The overhead application is inefficient since the liquid fertilizer falls between the plant containers. The result is multiple applications, waste, and harmful elevated nutrient runoff.

Slow release fertilizers delay the dissolution of the fertilizer substrate. Most slow release fertilizers, however, are not dependable in adverse environmental conditions such as high heat and moisture. Hot and wet conditions can cause slow release fertilizers to flash release, causing damage to both the plant material and the environment.

Prior art methods include encapsulating a fertilizer having a given chemical composition or compound such that the nutrients are released over a period of time. For example, coated urea has been used as a source of time released nitrogen, which is a nutrient that promotes plant height and leaf formation in a plant. U.S. Pat. Nos. 5,147,442, 5,560,768 and 6,500,223 each of which is incorporated in its entirety, illustrate such coated fertilizers and methods associated with them.

Encapsulated slow-release fertilizers may be classified into two major groups according to the fertilizer release mechanism:

(i) A first group in which the release is governed by the rate of water permeation through a polymeric or copolymeric membrane of the water-proofing material, and by the rate of fertilizer diffusion away from each coated particle into the surrounding soil. Typical examples of membrane material in slow-release fertilizers of this group are copolymers or glyceryl esters of unsaturated acids with dicyclopentadiene (U.S. Pat. No. 3,223,518), epoxy-polyester resins (U.S. Pat. No. 3,259,482), urethanes (U.S. Pat. No. 3,264,089) and polystyrenes (U.S. Pat. No. 3,158,462).

(ii) A second group with relatively thick encapsulating coats, in which release is governed mainly by rupture of the coat, a typical example being particulate fertilizers with sulfur based encapsulation. The rupture occurs upon the permeation of water into the coated particles as a result of the osmotic pressure that builds up within. The sulfur based coating in slow-release fertilizers of this second group are generally produced by spraying onto the particulate fertilizer a molten sulfur based material as disclosed, for example, in U.S. Pat. No. 4,857,098

Prior art methods of slowly releasing fertilizer nutrients fail to achieve efficient utilization by a crop or plant since differing stages of crop growth require different nutrients. For example, even though polymer coated fertilizers can be coated with a resin to slow fertilizer release, a drawback of these products is that they are typically a coated compound at set ratios which do not match the physiological needs of the plant and the timing of the crop. For example, prior art polymer coated fertilizers which are coated with a resin do not match all physiological needs of the plant and the timing of the crop, since the release of all nutrients is set to occur at the same time, as determined by the compound analysis of the fertilizer prill.

In another example, potassium enhances plant development at the bloom stage, and is best fed to the plant even after the release of nitrogen is substantially complete. Consequently early releasing potassium is redundant as the element is not PRIMARILY needed at the early stage. An early releasing coated nitrogen, or other early releasing coated nutrient or nutrient compound, directed at feeding root development has not simultaneously been an efficient source of potassium. Inefficient or multiple applications of potassium is required by prior art methods.

Further, extreme environmental conditions can cause both the polymer coated fertilizers described at (i) and (ii) above to release both too fast and too inconsistently, which results in damage to plant material as well as requiring multiple applications. Inefficient fertilization, missed applications, and additional labor costs from multiple applications increase costs and losses with respect to crops. What is needed is a method of delivering the proper single elements of nitrogen, phosphorous and potassium as nutrition to plants in the differing stages of plant growth without the need for multiple applications of fertilizer.

SUMMARY OF THE INVENTION

The present invention provides a fertilizer composition and method for staging the controlled release of nutrients such that the composition need only be applied once in at least one plant's growth cycle, but with individual nutrients releasing at predetermined, staged intervals targeted to the precise needs of the plant. A plurality of timed release particulate materials is blended to form the composition. The composition comprises a plurality of plant nutrients. The nutrients include a magnesium source (Mg), a potassium source (K), a nitrogen source (N), and a phosphate source (P). The composition is adapted to release each fertilizer nutrient over a period most beneficial to the plant's physiological growth.

In one embodiment, the invention provides a composition for the controlled release of nutrients to at least one plant during various parts of the plant's growing cycle. The composition comprises a plurality of timed release particulate materials. This composition's timed release materials are adapted to release phosphorus over a time period targeted to promote root development. The composition is also adapted to release nitrogen over a time period targeted to promote vegetation and foliation. The plurality of timed release particulate materials release potassium over a time period effective to promote flower set. Finally, the composition releases magnesium over a time period adapted to enhance nutrient uptake and chlorophyll production in the plant. Only one application of the composition is required to deliver the nutrients to the plant during it's life cycle, however releasing at staged intervals.

In another embodiment, the invention provides a method of providing for the controlled release of nutrients to at least one plant during various parts of the plant's growing cycle. The method comprises applying to the plant a blend of a plurality of timed release particulate materials wherein the plurality of timed release materials provide. This blend's timed release materials are adapted to release phosphorus over a time period targeted to promote root development. The blend is also adapted to release nitrogen over a time period targeted to promote vegetation and foliation. The plurality of timed release particulate materials release potassium over a time period effective to promote flower set. Finally, the blend releases magnesium over a time period adapted to enhance nutrient uptake and chlorophyll production in the plant. Only one application of the composition is required to deliver the nutrients to the plant during it's life cycle, however releasing at staged intervals.

DETAILED DESCRIPTION OF THE INVENTION

Compositions and methods for delivering the proper nutrition to plants in the differing stages of plant growth without the need for multiple applications of fertilizer are provided by this invention. The term "fertilizer" as used herein denotes an at least moderately water-soluble chemical substance or mixture of such substances, and the term "particulate fertilizer" used herein denotes any type of comminuted fertilizer such as granulated, pelleted, or microgranulated and the like. A process of Staged Nutrient Release (SNR) is based on the blending of water-soluble nutrient substrates to release different nutrients or nutrient compounds at different staged times over a crop cycle. The nutrients are staged to release in tune with the needs of the target plant.

The composition or blend comprises a plurality of timed release particulate materials. The plurality of timed release particulate materials that may be used in the invention are given by way of non-limiting examples, none of which limit the scope of the invention herein disclosed. Non-limiting examples of compositions which may be employed for timed release particulate materials can be found in U.S. Pat. Nos. 5,147,442, 5,560,768 and 6,500,223, each of which is incorporated in its entirety.

In a non-limiting example, semi-permeable resin membranes encapsulate particulate fertilizers. The membranes differ in porosity. The porosities are matched to the solubility of each specific nutrient to control the speed of release. During manufacturing, the thickness of the resin coating together with the choice of resin type coating membrane, creates the release criteria. The fertilizer substrate releases by timed osmosis back through release channels of the semi-permeable membrane, providing the corresponding nutrient to the crop. By matching each nutrient to a given porosity of the membranes, as well as adjusting resin thickness, the process individually controls the time release of each nutrient such at least one plant receive the appropriate fertilizer nutrient at the differing stages of the at least one plant's growth.

In another non-limiting example, individually coated particular fertilizers are blended to achieve a stable and dependable staged release of nutrients over time. P has a low solubility as compared to N or K. N and K, conversely, are much more rapidly soluble. In order for P to be released earlier than when it is needed, a more porous coating then can be used on the N or K is selected. As a result, P is released earlier, over about two or three months for example. Earlier release of P is in tune with the plant's needs, since the P requirement is common to all crop types insofar as P promotes root development. N and K, on the other hand, are most efficiently provided to a plant later in a crop cycle. Since N and K have a greater solubility than P, a less porous coating is used. The reduced porosity promotes a correspondingly longer release of the N and K, and further, releases the N and K at a later point in the crop cycle. The N, for instance, may release at about four to five months into the crop cycle, whereas the K may release on about a four to eight month release curve. This is standard for most crops as flower, fruit or seed set occur at latter stages of plant production or when plants are forced hungry. The SNR unique release combinations trigger a potential plant's potential death or end of season response, which further stimulates the natural cycle of plant reproduction resulting in greater flower set or winter hardiness. In order to achieve the appropriate nutrient releases, individually coated particular fertilizers are blended to achieve a stable and dependable staged release over time.

In one embodiment, a composition for delivering the proper nutrition to plants in the differing stages of plant growth without the need for multiple applications of fertilizer is provided. In this embodiment, a plurality of timed release particulate materials is blended to make the composition. Consequently, the composition comprises a plurality of fertilizer nutrients. The nutrients include a Mg source, a K source, a N source, and a P source. The nutrients may be provided both individually or in combination in any of the plurality of timed release particulate materials The composition provides for a controlled release of nutrients to a plant during various stages of the plant's growing cycle. The composition comprises a plurality of timed release particulate materials wherein the plurality of timed or staged release materials provide:

1) phosphorus over a time period targeted to promote root development in the plant's growth cycle;
2) nitrogen over a time period targeted to promote vegetation and foliation in the plant's growth cycle;
3) potassium adapted to release potassium over a time period targeted to promote flower set and hardiness of the plant's growth cycle; and
4) magnesium over a time period targeted to promote nutrient uptake and chlorophyll production in the plant's growth cycle.

In another embodiment, a method for delivering the proper nutrition to plants in the differing stages of plant growth without the need for multiple applications of fertilizer is provided. In this embodiment, a plurality of timed release particulate materials is blended. This blend thus comprises a plurality of fertilizer nutrients. The nutrients include a Mg source, a K source, a N source, and a P source. The nutrients may be provided both individually or in combination in any of the plurality of timed release particulate materials The blend provides for a controlled release of nutrients to a plant during various stages of the plant's growing cycle. The plurality of timed release particulate materials or staged release materials provide:

1) phosphorus over a time period targeted to promote root development in the plant's growth cycle;

2) nitrogen over a time period targeted to promote vegetation and foliation in the plant's growth cycle;
3) potassium adapted to release potassium over a time period targeted to promote flower set and hardiness of the plant's growth cycle; and
4) magnesium over a time period targeted to promote nutrient uptake and chlorophyll production in the plant's growth cycle.

In a non-limiting example of the above-mentioned composition and method, timed release particulate materials such as encapsulated fertilizers may include fertilizer nutrients in various ratios. The uniqueness of Staged Nutrient Release is the ratios change over time as each nutrient charge is initiated while others dissipate. In this fashion Staged Nutrient Release becomes several different fertilizer products, changing as the plant requirements dictate, yet applied as one product due to the staging of nutrient release. This is unique to this product know-how.

Development may comprise a time period most beneficial for a given plant, for instance about the first three months of the cycle common for many plant species requires an exemplary P source which may be a coated phosphate. Early stage slow release of P, along with encouraging root development, removes the need for multiple applications of P.

A coated N source that releases N over a time period targeted to promote vegetation and foliation. The slow release of N may be in the form of a coated high nitrate nitrogen that evenly releases N over about six months, which is one common, but non-limiting example of the periods for certain short term plant production. However, a longer N release source can be provided for crops requiring longer release periods, and further, can be custom blended into an overall composition. The N would produce plant height and leaf formation midterm in a crop cycle. It also would do away with the need for multiple applications of a granular or liquid N.

A coated K source, which is effective to promote flower set and winter hardiness, may release K over about four to eight months one of the, which is one common, but non-limiting example of the periods for certain short term plant production. However, a longer K release source can be provided for crops requiring longer release periods, and further, can be custom blended into an overall composition. The staged nutrient release of K is released over a longer period than N from the N source, resulting in a predetermined changed ratio providing a greater ratio of K to N later in the production cycle. This improves flower set and winter hardiness at the end of crop cycle. Also, the method eliminates the need for multiple applications of a K nutrient source such as liquid or granular potash.

A coated magnesium source that releases magnesium over period of a plant's growth cycle. This enhances, inter alia, chlorophyll production and plant nutrient intake.

Finally, a coated source comprised of P, K, N, and at least one micronutrient may be included in the composition to release over a complete crop cycle. Baseline fertilization occurs over a full crop cycle (e.g.: six, nine, or twelve months). The Staged Nutrient Release composition can be customized and produced to alter the periods for particular crops by supplying nutrients from these sources to release at different speeds. Over this period, the staged nutrient release of the other encapsulated fertilizers release specific nutrients timed to specific stages in a crop's growth cycle. The composition thus wholly eliminates the need for multiple applications of these fertilizers, as the timed-release particulate materials can provide full nutrition appropriate to each stage of a crop's growth cycle.

In another non-limiting example, one timed release particulate material of the blend may be an encapsulated fertilizer comprising time released N—P—K—Mg at the percentages of 20-0-13-0. This coated material comprises potassium nitrate that provides readily available single source of controlled released N and K wherein there is more N than K, as opposed to a standard potassium nitrate which releases at the common percentages of 12-0-42. The addition of the 20-0-13-0 material to the blend for staged nutrient release enhances the blend's K source and the N base.

In yet another non-limiting example, the composition can have a coated fertilizer that provides a long term K source, for instance the potassium nitrate releasing at the percentages of 12-0-42.

A coated urea (e.g., 40-0-0) is another non-limiting example of a source of N to the blend. Any known coated potassium is an example of a source of K.

A coated phosphate such as monoammonium phosphate, at the percentages 10-49-0 is an example of yet another encapsulated fertilizer of the blend. The P source is coated to release in an early period to promote root development.

In another non-limiting example, an encapsulated particulate fertilizer provides a baseline time release, for example about 180 days, so that N will be used up or taper off before the bloom stage of given plant. A fertilizer comprising an N source (e.g.: Ammoniacal Nitrogen and Nitrate Nitrogen), a Phosphoric Acid, and a Soluble Potash at the percentages of 18-6-8 could be used. As blooming occurs and the N release has tapered off, the long-term K aids in the plant's blooming. Also feeding the bloom as N is exhausted, an encapsulated particulate fertilizer comprised of a potassium sulfate (e.g.: 0-0-18) may be added to the blend to provide the source of long-term K; the fertilizer may also comprise a magnesium sulfate (e.g.: 0-0-18-9) to include a source of Mg.

Another exemplary component of the blend provides a controlled release of Mg. Mg is released over a period of time from an encapsulated particulate fertilizer comprising a magnesium source (e.g.: 0-0-0-22, 0-0-0-13). The period of time of release is targeted to enhance nutrient uptake and chlorophyll production. The addition of the 0-0-0-13 fertilizer, for example, provides an additional source of Mg.

The invention thus provides a composition for controlled release of nutrients to plants during various parts of the plants' growing cycle. The composition comprises a plurality of timed release particulate materials. The plurality of timed release materials provides a magnesium source, a potassium source, a nitrogen source, and a phosphate source. The composition is adapted to release each fertilizer nutrient during a period most beneficial to plants and requires only one application during a plant's entire life cycle.

The invention also provides a method of providing for the controlled release of nutrients to at least one plant during various parts of the plant's growing cycle. This method comprises applying a blend of a plurality of timed release particulate materials to the plant. The plurality of timed release materials provides a magnesium source, a potassium source, a nitrogen source, and a phosphate source. The blend is adapted to release each fertilizer nutrient during a period most beneficial to a plant and requires only one application during the plant's entire life cycle.

Although the present invention has been described in relation to particular preferred embodiments and examples thereof, many variations and modifications and other uses may be made without departing from the invention. Accordingly, it is intended that all such alterations and modifications be included within the spirit and scope of the invention as disclosed herein. Further, all examples provided herein do not limit the scope of the invention.

I claim:

1. A composition for a staged, controlled release of nutrients to at least one plant during various parts of the plant's growing cycle comprising a plurality of timed release particulate materials wherein said timed release is controlled by a semi-permeable resin membrane adapted to provide nutrient release tailored to a plant's nutrition needs over time, and wherein the plurality of timed release materials include:
   a) a particulate material that releases sufficient phosphorous for said plant's nutritional needs over an early time period of the plant's growth cycle, whereby the early time period ranges over the first months of root development of the plant;
   b) a particulate material that releases sufficient nitrogen for said plant's nutritional needs over a mid-term time period of the plant's growth cycle, whereby the mid-term time period ranges over the months of vegetation and foliation of the plant;
   c) a particulate material that releases sufficient potassium for said plant's nutritional needs over a late term time period of the plant's growth cycle, whereby the late term time period ranges over the months of flower set of the plant; and
   d) a particulate material that releases sufficient magnesium for said plant's nutritional needs over a complete crop-cycle, wherein magnesium constitutes at least about 9% of the composition by weight;
wherein the composition is adapted such that one application during the plant's entire life cycle can deliver the staged release of nutrients and wherein the composition releases nutrients by osmosis through said semi-permeable resin membrane.

2. The composition of claim 1 wherein the composition is adapted to release each nutrient over periods and in amounts most beneficial to a targeted plant, the targeted plant's life cycle ranging from about six to about eighteen months, including:
   releasing phosphorous over the early time period of about the first two to three months of the plant's growth cycle;
   releasing substantially all the nitrogen over the mid-term time period of about at least the first six months of the plant's growth cycle; and
   releasing substantially all the potassium over the late term period of from about four to about at least eight months of the plant's growth cycle, whereby the potassium continues to be released after the nitrogen is exhausted.

3. The composition of claim 1 wherein the composition comprises at least one timed release particulate material comprising magnesium.

4. The composition of claim 1 wherein the composition comprises at least one timed release particulate material comprising nitrogen and potassium.

5. The composition of claim 1 wherein the composition comprises at least one timed release particulate material comprising nitrogen and phosphorous.

6. The composition of claim 1 wherein the composition comprises at least one timed release particulate material comprising nitrogen, phosphorous, and potassium.

7. The composition of claim 1 wherein the composition comprises at least one timed release particulate material comprising nitrogen.

8. The composition of claim 1 wherein the composition comprises at least one timed release particulate material comprising potassium.

9. The composition of claim 1 wherein the composition comprises at least one timed release particulate material comprising potassium and magnesium.

10. The composition of claim 1 wherein the composition comprises at least one timed release particulate material comprising:
    a nitrogen source comprising a urea.

11. The composition of claim 1 wherein the composition comprises a first encapsulated particulate material comprising:
    a nitrogen source comprising a Nitrate Nitrogen;
    a phosphorous source comprising a Phosphoric Acid;
    a potassium source comprising a Potash.
wherein all the nitrogen is substantially released before the flower set.

12. The composition of claim 11 wherein the composition further comprises a second encapsulated particulate material comprising:
    a potassium source comprising a potassium sulfate; and
    a magnesium source comprising a magnesium sulfate.

13. The composition of claim 12 wherein the composition further comprises a third encapsulated particulate material comprising a magnesium source.

14. The composition of claim 4 wherein the particulate material comprises potassium nitrate.

15. The composition of claim 5 wherein the phosphorous source comprises a monoammonium phosphate.

16. A method of providing for a staged controlled release of nutrients to at least one plant during various parts of the plant's growing cycle, the method comprising:
    applying to the plant a blend of a plurality of timed release particulate materials wherein individual particulate materials are encapsulated by a semi-permeable resin membrane adapted to provide nutrient release tailored to a plant's nutrition needs over time, and wherein the plurality of timed release materials release:
    a) phosphorous only sufficient for said plant's nutritional needs over an early release time period of the plant's growth cycle, whereby the early time period ranges over the first months of root development of the plant;
    b) nitrogen only sufficient for said plant's nutritional needs over a mid-term time period of the plant's growth cycle, whereby the mid-term time period ranges over the months of vegetation and foliation of the plant;
    c) potassium only sufficient for said plant's nutritional needs adapted to release potassium over a long term time period of the plant's growth cycle, whereby the late term time-period ranges over the months of flower set of the plant; and
    d) magnesium only sufficient for said plant's nutritional needs over a complete crop-cycle, wherein magnesium constitutes at least about 9% of the composition by weight;
whereby one application of the blend during the plant's entire life cycle can deliver the staged release of the nutrients and wherein the delivery of said nutrients occurs by osmosis through said semi-permeable resin membrane.

17. The method of claim 16 wherein the blend is adapted to release each nutrient over periods and in amounts most beneficial to a targeted plant, the targeted plant's life cycle ranging from about six to about eighteen months, including:
    releasing phosphorous over the early time period of about the first two to three months of the plant's growth cycle;
    releasing substantially all the nitrogen over the mid-term period of about at least the first six months of the plant's growth cycle; and releasing substantially all the potassium over the later term time-period of from about four to about at least eight months of the plant's growth cycle, whereby the potassium continues to be released after the nitrogen is exhausted.

18. The method of claim 16 wherein the blend comprises at least one timed release particulate material comprising magnesium.

19. The method of claim 16 wherein the blend comprises at least one timed release particulate material comprising nitrogen and potassium.

20. The method of claim 16 wherein the blend comprises at least one timed release particulate material comprising nitrogen and phosphorous.

21. The method of claim 16 wherein the blend comprises at least one timed release particulate material comprising nitrogen, phosphorous, and potassium.

22. The method of claim 16 wherein the blend comprises at least one timed release particulate material comprising nitrogen.

23. The method of claim 16 wherein the blend comprises at least one timed release particulate material comprising potassium.

24. The method of claim 16 wherein the blend comprises at least one timed release particulate material comprising potassium and magnesium.

* * * * *